May 9, 1961 C. J. SMITH, JR., ET AL 2,983,582
PRODUCTION OF DIBORANE
Filed July 29, 1957
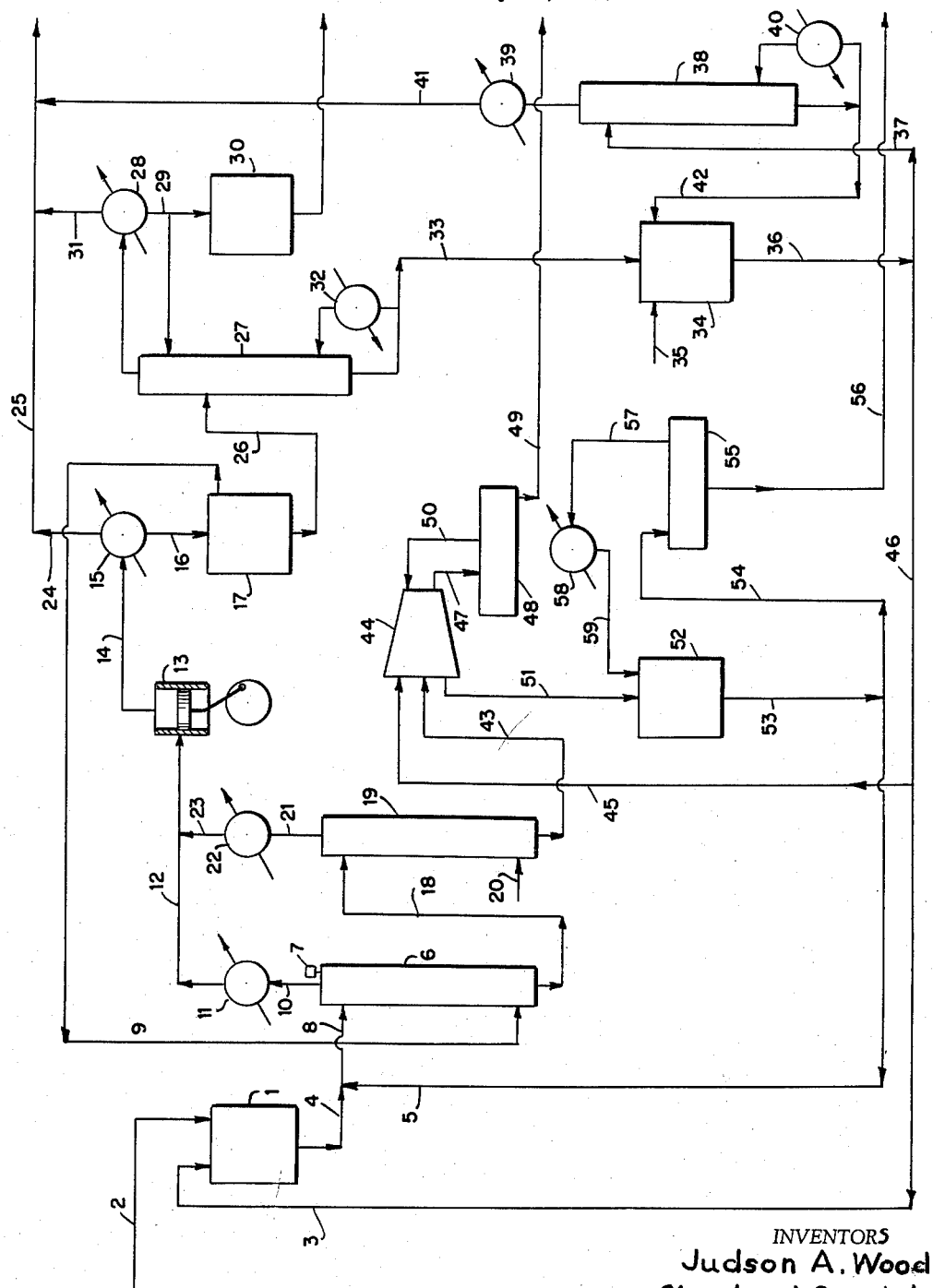
INVENTORS
Judson A. Wood
BY Charles J. Smith Jr.
Adams, Forward and McLean
ATTORNEYS

2,983,582
PRODUCTION OF DIBORANE

Charles J. Smith, Jr., deceased, late of Williamsville, N.Y., by Lois Hopkinson Smith, executrix, Williamsville, and Judson A. Wood, Niagara Falls, N.Y., assignors to Olin Mathieson Chemical Corporation, a corporation of Virginia Filed July 29, 1957, Ser. No. 674,971

1 Claim. (Cl. 23—204)

This invention relates to the production of diborane. It has heretofore been proposed to manufacture diborane by reacting lithium hydride and boron trichloride while they are in admixture with diethyl ether. The reaction was carried out batchwise, however, and did not evolve diborane smoothly. Thus, the process was not satisfactory for the production of large quantities of diborane. In accordance with the present invention an improved method for the production of diborane from lithium hydride and boron trichloride has been devised. The process of the present invention utilizes two reaction stages, in the first stage of which lithium hydride slurried in diethyl ether is reacted with diborane recycled from the second reaction stage to produce lithium borohydride, and in the second stage of which lithium borohydride slurried in diethyl ether is reacted with boron trichloride to produce diborane and lithium chloride in accordance with the following equations:

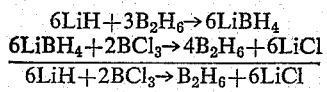

$$6LiH + 3B_2H_6 \rightarrow 6LiBH_4$$
$$6LiBH_4 + 2BCl_3 \rightarrow 4B_2H_6 + 6LiCl$$
$$\overline{6LiH + 2BCl_3 \rightarrow B_2H_6 + 6LiCl}$$

The process is satisfactory for use in the production of commercial quantities of diborane in a smooth and continuous manner. In addition, the pressure and temperature conditions in each reaction stage are maintained such that a portion of the diethyl ether passes overhead with the diborane from each reaction stage and when condensed and separated from the diborane, provides a convenient source of clean, pure diethyl ether which is required, for example, for slurrying the lithium hydride reactant.

In accordance with the invention, lithium hydride slurried in diethyl ether is reacted with diborane gas at a temperature of about 10° to 30° C. and a pressure of about 3 to 5 p.s.i.g. in a first reaction stage to produce lithium borohydride. The lithium borohydride, while slurried in the ether, is passed to a second reaction stage and therein is reacted with boron trichloride gas at a temperature of about 10° to 30° C. and a pressure of about 3 to 5 p.s.i.g. to produce diborane and lithium chloride. The lithium chloride slurried in ether is withdrawn from the second reaction stage and can be passed to an electrolysis system for converting the lithium chloride into metallic lithium which in turn can be reacted with hydrogen to provide further quantities of lithium hydride. The reaction in each stage is advantageously conducted under forced agitation and under the same conditions of temperature and pressure. A mixed stream of diborane and diethyl ether vapor is withdrawn overhead from each of the first and second reaction stages, compressed to a pressure of about 65 to 100 p.s.i.g., and passed to a partial condenser maintained at a temperature of about 0° to +40° C. A gaseous portion of the condenser effluent containing at least 75%, preferably 80 to 90%, of the diborane produced in the second reaction stage is withdrawn and passed to the first reaction stage to provide the diborane required to react with lithium hydride to form lithium borohydride. The quantity of diborane produced in the second reaction stage is based on the stoichiometric relationships presented above so that for every six moles of lithium hydride charged to the first reaction stage, two moles of boron trichloride are charged to the second reaction stage and at least 3 moles of diborane are recycled to the first reaction stage. The remainder of the condenser effluent is withdrawn and the diborane content is recovered as product, as by distillation. Advantageously, the partial condenser is maintained at such a temperature that the total gaseous portion of the condenser effluent is recycled and the total liquid portion is passed to product recovery.

The following example illustrates in detail an embodiment falling within the scope of this invention and is to be considered in conjunction with the accompanying drawing which depicts schematically a process flow plan.

Example I

In the drawing, the numeral 1 designates a feed slurry tank into which there are introduced by means of line 2, 861 pounds per hour of lithium hydride and 55 pounds per hour of lithium chloride normally associated with lithium hydride as an impurity. Also introduced into tank 1 by means of line 3 is a mixture of 6310 pounds per hour of diethyl ether, 1 pound per hour of heavy organics dissolved from the lubricants used in the pump seals and centrifuge, and 245 pounds per hour of low boiling impurities originally introduced into the system as impurities in the boron trichloride feed. The concentration of lithium hydride in the feed slurry leaving tank 1 is about 11.5 percent by weight.

To the material withdrawn from tank 1 by means of line 4 there is added by means of line 5 the following materials flowing at the following rates in pounds per hour: diborane, 2006; diethyl ether, 167,037; lithium chloride, 168; heavy organics, 1670; and low boiling impurities such as ethyl chloride originally introduced into the system as an impurity in the boron trichloride feed, 4846. Thus entering first reactor stage 6, equipped with agitator 7, by means of line 8 is a reactant stream containing the following materials flowing at the following rates in pounds per hour: diborane, 2006; diethyl ether, 173,347; lithium hydride, 861; lithium chloride, 168; low boiling impurities, 5091; heavy organics, 1672; and inorganic impurities, 55. Also entering first reactor stage 6 is a mixed stream of 2000 pounds per hour of diborane, and 740 pounds per hour of diethyl ether together with 78 pounds per hour of low boiling material by way of line 9 leading from collector tank 17.

A mixture of 527 pounds per hour of diborane, 1540 pounds per hour of diethyl ether and 89 pounds per hour of low boiling impurities is withdrawn from reactor 6 through line 10, and passed through cooler 11, line 12, compressor 13, line 14, partial condenser 15 and line 16 to collector tank 17. There is also withdrawn from reactor 6 and passed by means of line 18 to second reactor stage 19 a mixture of the following materials flowing at the following rates in pounds per hour: diborane, 1979; diethyl ether, 164,517; lithium borohydride diethyl etherate, 10,391; lithium chloride, 168; low boiling impurities, 5080; heavy organics, 1673; and inorganic impurities, 55. Also introduced into reactor 19 through line 20 are 4230 pounds per hour of boron trichloride together with 90 pounds per hour of low boiling impurities.

There is withdrawn overhead from reactor 19 and passed by way of line 21, cooler 22, line 23, line 12, compressor 13, line 14, partial condenser 15, line 16 to collector tank 17 a mixture of 1973 pounds per hour of diborane, 5740 pounds per hour of diethyl ether, and 333 pounds per hour of low boiling impurities. Partial condenser 15 is vented by means of line 24 to vent line 25 to a scrubber (not shown).

From collector tank 17, there is withdrawn by means of line 26 and passed to diborane recovery column 27 a mixture of 500 pounds per hour of diborane, 6540 pounds per hour of diethyl ether, and 344 pounds per hour of low boiling material. Column 27 is equipped with reflux condenser 28 from which 500 pounds per hour of diborane is withdrawn through line 29 and passed to storage tank 30. Reflux condenser 28 is vented by means of line 31 to vent line 25. Column 27 is also equipped with reboiler 32. From column 27 is withdrawn as bottoms 6540 pounds per hour of diethyl ether and 344 pounds per hour of low boiling material which are passed by means of line 33 to diethyl ether storage tank 34 into which 90 pounds per hour of makeup diethyl ether is introduced by means of line 35.

A stream containing 8860 pounds per hour of diethyl ether and 344 pounds per hour of low boiling impurities is withdrawn from storage tank 34 by means of line 36 and a sidestream containing 2320 pounds per hour of diethyl ether and 90 pounds per hour of low boiling impurities is passed by way of line 37 to ether cleanup column 38 equipped with partial condenser 39 and reboiler 40. From partial condenser 39, 90 pounds per hour of diethyl ether and 90 pounds per hour of low boiling impurities are passed through line 41 to vent line 25. From cleanup column 38 there is withdrawn as bottoms 2230 pounds per hour of diethyl ether which is returned to storage tank 34 by way of line 42.

There is withdrawn from reactor 19 through line 43 and passed to centrifugal separator 44 the following materials flowing at the following rates in pounds per hour: diborane, 2006; diethyl ether, 166,807; lithium chloride, 4759; low boiling impurities, 4837; heavy organics, 1674; and inorganic impurities, 55. There is also introduced into centrifugal separator 44 a wash stream containing 230 pounds per hour of diethyl ether and 9 pounds per hour of low boiling material from ether storage tank 34 by way of lines 36, 45 and 46. There is withdrawn as solids from centrifugal separator 44 by means of line 47 and passed to drier 48 the following mixture flowing at the following rates in pounds per hour: diethyl ether, 93; lithium chloride, 4590; low boiling impurities, 4; and inorganic impurities, 55. From drier 48, 4590 pounds per hour of lithium chloride and 55 pounds per hour of inorganic impurities are removed by line 49 to a lithium chloride purification system not shown. Also from drier 48, 93 pounds per hour of diethyl ether and 4 pounds per hour of low boiling impurities are returned to separator 44 by line 50. The filtrate from centrifugal separator 44 is withdrawn through line 51 to filtrate tank 52 and is composed of a mixture of the following materials flowing at the following rates in pounds per hour: diborane, 2006; diethyl ether, 167,037; lithium chloride, 169; low boiling impurities, 4846; and heavy organics, 1679. A stream is withdrawn from filtrate tank 52 by means of line 53 containing the following materials flowing at the following rates in pounds per hour: diborane, 2018; diethyl ether, 168,037; lithium chloride, 169; low boiling impurities, 4875; and heavy organics, 1679. This stream is divided into two sidestreams, one passing through line 5 and the other through line 54 to still 55 containing 12 pounds per hour of diborane, 1000 pounds per hour of diethyl ether, one pound per hour of lithium chloride, 29 pounds per hour of low boiling impurities, and 10 pounds per hour of heavy organics. From still 55 there is removed as bottoms by means of line 56, 10 pounds per hour of heavy organics and 1 pound per hour of lithium chloride. An overhead stream from still 55 containing 12 pounds per hour of diborane, 1000 pounds per hour of diethyl ether and 29 pounds per hour of low boiling impurities is passed through line 57, condenser 58 and line 59 and returned to storage tank 52.

Although certain vent lines are not shown in the drawing, tanks 1 and 34 are also vented to vent line 25 to the scrubber, not shown. There the gases are scrubbed with water before release to the atmosphere. Also centrifugal separator 44, drier 48, storage tank 52, still 55 and condenser 58 are all vented to reactors 6 and 19, through the suction intake of compressor 13.

In the process of the example the temperature and pressure in reactors 6 and 19 are the same and are maintained at 25° C. and 4 p.s.i.g. Coolers 11 and 22 are maintained at 25° C. Compressor 13 raises the pressure of the diborane-ether streams from reactors 6 and 19 to 85 p.s.i.g., and partial condenser 15 is operated at 29° C. in order to provide a recycle stream containing about 80% of the diborane produced in reactor 19. Collector tank 17 is also maintained at 29° C. and 85 p.s.i.g. so that the material withdrawn through line 9 is vapor and the material withdrawn through line 26 is liquid. The diborane recovery column 27, condenser 28 and storage tank 30 operate at 80 p.s.i.g. Condenser 28 and storage tank 30 operate at −50° C. As will be appreciated by those skilled in the art, various modifications can be made in the specific operation just described to provide other embodiments which fall within the scope of this invention.

The diborane product passed to tank 30 amounts to 6 tons per day and is better than 99 percent pure. The proportion of lithium hydride converted to lithium borohydride is about 97 percent, 96 percent of the lithium hydride being converted in first reaction stage 6 and about 1 percent being converted in the second reaction stage 19. The proportion of lithium borohydride converted to diborane is about 98.7 percent and the proportion of boron trichloride converted to diborane is also about 98.7 percent.

It is claimed:
1. A process for the production of diborane from lithium hydride and boron trichloride which comprises reacting lithium hydride slurried in diethyl ether with diborane in a first reaction stage at a temperature of about 10° C. to 30° C. and a pressure of about 3 to 5 p.s.i.g. to produce lithium borohydride, passing the lithium borohydride slurried in diethyl ether to a second reaction stage and therein reacting the lithium borohydride with boron trichloride at a temperature of about 10° C. to 30° C. and a pressure of about 3 to 5 p.s.i.g. to produce diborane and lithium chloride, withdrawing lithium chloride slurried in diethyl ether from the second reaction stage, withdrawing overhead a mixed stream of diborane and diethyl ether vapor from each of the first and second reaction stages, compressing the mixed streams of diborane and diethyl ether vapor to a pressure of about 65 to 100 p.s.i.g., passing the compressed mixed streams to a partial condenser maintained at a temperature of about 0° to 440° C., withdrawing a gaseous portion of the condenser effluent containing at least 75% of the diborane produced in the second reaction stage, passing said gaseous portion of the condenser effluent to the first reaction stage, withdrawing the remainder of the condenser effluent, and recovering the diborane content of the remainder of the condenser effluent as product.

References Cited in the file of this patent
UNITED STATES PATENTS

| 2,553,198 | Lesesne | May 15, 1951 |
| 2,658,815 | Boldebuck et al. | Nov. 10, 1953 |
| 2,658,816 | Boldebuck et al. | Nov. 10, 1953 |
| 2,796,328 | Jackson et al. | June 18, 1957 |
| 2,796,329 | Jackson et al. | June 18, 1957 |